June 26, 1951  W. H. BROWN  2,557,936
HYDRAULIC SYSTEM FOR VEHICLE STEERING
Original Filed Nov. 3, 1944  2 Sheets-Sheet 1

Inventor
WESLEY H. BROWN,
By
Attorneys

June 26, 1951 W. H. BROWN 2,557,936
HYDRAULIC SYSTEM FOR VEHICLE STEERING
Original Filed Nov. 3, 1944 2 Sheets-Sheet 2
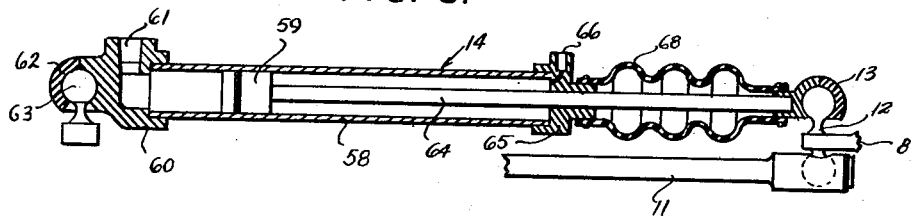
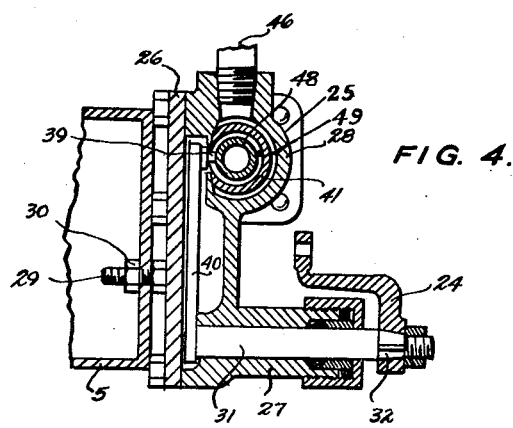
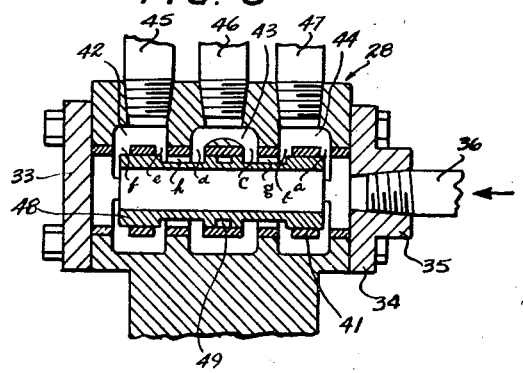 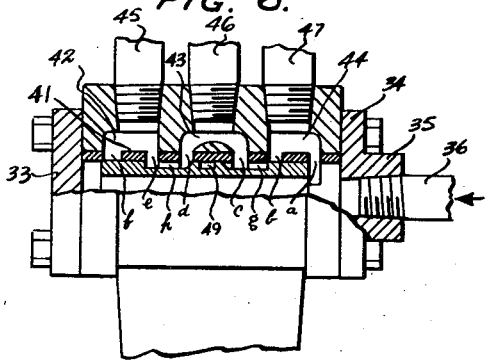
Inventor
WESLEY H. BROWN, Patented June 26, 1951

2,557,936

UNITED STATES PATENT OFFICE 2,557,936

HYDRAULIC SYSTEM FOR VEHICLE STEERING

Wesley H. Brown, Knoxville, Tenn.

Original application November 3, 1944, Serial No. 561,755. Divided and this application June 7, 1946, Serial No. 675,136

3 Claims. (Cl. 60—52)

This is a divisional application for patent covering a hydraulic system originally shown and described in my copending application for patent, filed November 3, 1944, Serial Number 561,755, now abandoned.

This instant invention relates to a hydraulic system adapted for but not limited to association with a steering mechanism such as is employed on motor vehicles.

The main object of the invention is to provide a hydraulic system including a circulating pump, a pair of fluid pressure responsive units, a manually operable control valve in one position permitting the free circulation of the pressure fluid and in either of two other positions directing the pressure to one of said units.

Another object is to provide a system of the class described and of simple, durable and economical construction.

With these and other objects in view the invention resides in the novelty of construction and combination of elements specifically hereinafter described and distinctly claimed in the appended claims.

The description should be read in connection with the accompanying drawing forming part of the application and showing a preferred embodiment of my invention and wherein:

Figure 3 is a fragmentary longitudinal sectional view of one of the hydraulic responsive units.

Figure 4 is an enlarged fragmentary vertical sectional view taken substantially on line 4—4 of Figure 2.

Figure 5 is a fragmentary vertical sectional view showing the control valve in neutral position.

Figure 6 is a fragmentary vertical sectional view through the control valve showing the valve element in position for supplying hydraulic force to the right hydraulic responsive unit.

Figure 1:
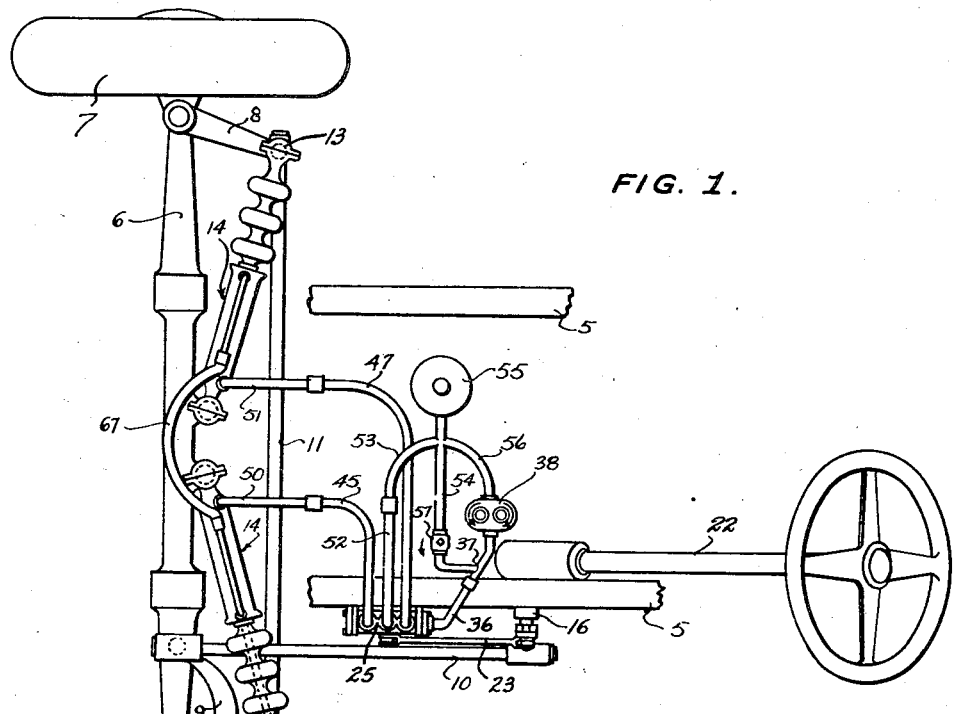
Figure 1 is a fragmentary top plan view showing the present invention installed on a steering mechanism.

In the drawings wherein like characters of reference designate like or similar parts, the present invention is illustrated as associated with the steering mechanism of a motor vehicle, but is adapted for embodiment in various other mechanisms or machinery for improved and substantially effortless control of the working parts.

To the chassis 5 of an automobile is attached a front axle 6 to either end of which is pivotally connected the stub axle of a front wheel 7, each stub axle having a steering arm 8. One of the arms 8 has a knuckle arm 9 to the free end of which is pivoted the front end of a rearwardly extending drag link 10. The free ends of the arms 8 are each pivoted to the ends of a link bar 11 (Figures 1 and 3) by means of a ball link 12 having a tapered shank tightly fitted in an arm 8, a lower ball socketed in the link bar 11, and an upper ball disposed in a socket 13 formed at the outer end of one of a pair of pressure-responsive units 14 (Figure 3). The upper ball for socket 13 is formed as part of a nut which retains the ball shank in a tapered hole in knuckle arm 8.

A steering arm 15 is at its upper end rigid with the outer end of a horizontal steering counter shaft 16 journaled in one of the chassis members 5 and has at its lower end in rigid relation a horizontal stub shaft 17 on the outer portion of which a rockable relay arm 18 is pivotally mounted for oscillation. This arm 18 has near its upper end an oversize opening 19 accommodating a pin 20 extending outwardly of the chassis 5 and from the arm 15, this pin 20 and opening 19 permitting a short oscillatory motion of relay arm 18. Other means permitting such limited motion may be provided.

Figure 2:
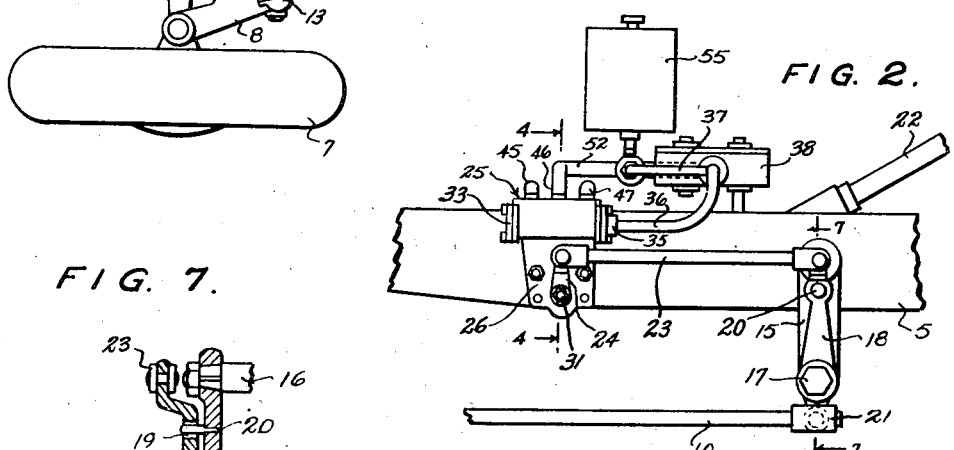
Figure 2 is a fragmentary side elevational view of the structure shown in Figure 1.
Figure 7:
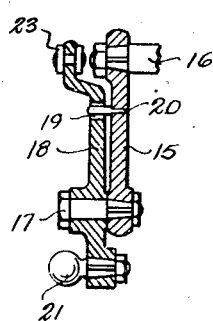
Figure 7 is a fragmentary vertical sectional view taken on line 7—7 of Figure 2.

The drag link 10 engages a ball 21 fixed on the lower end of the relay arm 18 (Figures 2 and 7). A steering column 22 is in driving relation with counter shaft 16 which operates arm 15 and 18 (Figures 1 and 2).

The outwardly offset upper end of arm 18 is pivoted to a link 23 pivoted at its other end to the upper inwardly offset arm 24 of a control valve generally indicated by numeral 25 (Figures 1, 2 and 4) and forming an important part of the invention.

The control valve 25 is a casting including a cover plate 26, an outstanding bearing 27 and a horizontally disposed barrel 28, the valve being secured to the chassis 5 by extended cover bolts 29 and nuts 30.

A transverse horizontal shaft 31 is journaled in the bearing 27 and is rigidly secured near its outer end, as at 32, to the lower end of the inwardly offset arm 24 (Figure 4). The barrel has headers 33, 34, the latter having an internally threaded boss 35 receiving the adjacent end of a pressure supply pipe 36 which extends from a T-fitting 37 at the outlet side of a suitable pump 38 (Figures 1 and 2).

A pintle 39 projects through a longitudinal slot in a fixed sleeve 41 which lines the barrel 28. At the top of barrel 28 are ports 42, 43, 44 in communication with pipes 45, 46, 47 respectively (Figures 5 and 6).

The fixed sleeve 41 has near its outer end a port $a$ which may establish communication between port 44 and pipe 36, and adjacent the wall of barrel 28 between port 44 and 43 a port $b$. A port $c$ is formed in sleeve 41 on the other side of the wall described. Sleeve ports $d$ and $e$ are on opposite sides of the barrel wall between ports 43 and 42. Sleeve port $f$ is adjacent the left-hand end wall of barrel 28.

A tubular piston valve 48 is slidably arranged in the fixed sleeve 41 and has at the intermediate portion of its outer surface a circumferential annular groove 49 for receiving the pintle 39 on the arm 40 (Figure 4). By means of the arm 40 the piston valve 48 is shifted so as to control the opening and closing of ports 42, 43, 44.

In the outer surface of valve tube 48 and on either side of the annular groove 49 are grooves $g$ and $h$.

Figure 1 shows pipe 45 connected by tube 50 to the left-hand hydraulic unit 14 while the pipe 47 is connected by a tube 51 to the right-hand hydraulic unit.

The pipe 46 is connected by a tube 52 to a pipe 53 which connects to pipe 54 communicating with a liquid reservoir 55. The pipe 54 also connects with a pipe 56 in communication with the intake side of the pump 38 which may be of the gear or any other approved type. The reservoir pipe 54 is connected by a check valve 57 opening in the direction of the arrow (Figure 1) to the central leg of the T-fitting 37.

As both hydraulic units 14 are of identical construction a description of one will suffice.

The right-hand unit of Figure 3 consists of an elongated cylinder 58 having a piston 59 slidable therein. One end of cylinder 58 has a header 60 with a port 61 therein for communication with tube 51 and the interior of cylinder 58. The header 60 includes a socket 62 fitting over a ball 63 supported on the axle 6.

A rod 64 extends from the piston 59 through a guide 65 with a port 66 for exhausting the air from the end of the cylinder on the outer side of the piston to a pipe line 67 extending between the outer ends of the cylinders 58. Thus the same air is used, and new air which may carry grit and other like foreign matter is excluded. A flexible boot 68 is fastened at one end to the guide 65 and at the other end to socket 13, whereby the piston rod 64 is effectively protected from contact with dirt, sand or other foreign matter causing wear of the piston.

When the valve is set in the intermediate position of Figure 5, liquids under pressure from the pump will enter through pipe 36, ports $a$ and $b$, groove $g$, ports $c$, 43, and also through ports $f$, 45, $e$, groove $h$, ports $d$, 43 and return through pipes 45, 52, 53, 56 to the inlet side of the pump. The liquid follows this path of least resistance and has an equal and therefore steadying effect on units 14, since port 42 and 44 are open.

If it is desired that the vehicle be steered to the left, the steering column 22 is turned toward that side, with the result that the steering arm is swung, and relay arm 18 moves the valve sleeve 48 to the left (Figures 2 and 6). This movement interrupts communication between ports $b$ and groove $g$, ports $c$, 43, $d$, groove $h$, port $e$. Sleeve port $f$ is also closed. The pressure liquid cannot reach ports 43, 42, but flows through pipes 47, 51 to the right-hand unit 14, moving the piston 59 and arm 8 connected thereto outwardly.

Thus the wheels 7 are turned to the left and the air in the outer end of the right-hand unit 14 passes into the corresponding end of the left-hand unit 14, the piston 59 of which is moved inwardly by the link bar 11.

Shifting of the valve 48 to the right will have the opposite effect of steering the vehicle to the right.

Returning the valve 48 to the intermediate or neutral position of Figure 5 will permit the liquid to circulate from the pump 38 ports $a$, $b$, groove $g$, ports $c$, 43 and also through ports $f$, $e$, groove $h$, ports $d$, 43.

Check valve 57 allows the liquid to flow freely from reservoir 55 to the outlet pipe 36, but does not allow liquid from the latter to enter the pump inlet pipe 36. This check valve may be built in the pump housing or cover thereof. Furthermore, a spring-loaded relief valve (not shown) may be provided to protect the system from excessive pressures.

When the pump 38 is inoperative, complete manual operation of the steering mechanism is accomplished through the arm 15 acting on the drag link 10.

Since only a small movement of relay arm 18 is necessary to shift valve 48, the lost motion between pin 20 and the opening 19 in arm 18 is also small.

While the foregoing description sets forth the invention in specific terms, it is to be understood that numerous changes in the shape, size and materials may be resorted to without departing from the spirit and scope of the invention as claimed hereinafter.

I claim:

1. In a hydraulic system, a pair of cylinders arranged in end to end confronting spaced relation, a first port in said cylinders adjacent each of said confronting ends, a second port in said cylinders adjacent each of the nonconfronting ends, a pipe conecting said second ports of said cylinders together, a piston mounted in each of said cylinders for reciprocatory movement, a rod positioned in each of said cylinders and having one end secured to the adjacent piston and having the other end projecting out of and beyond the nonconfronting end of the adjacent cylinder adapted to be connected to a member actuable in response to the reciprocatory movement of the piston in the adjacent cylinder, a flexible hollow boot surrounding the projecting end portion of each of said rods and having one end fixedly secured to the nonconfronting end of each of said cylinders, a reservoir adapted to contain fluid, a control valve including a barrel provided with a third, fourth and fifth port arranged in spaced relation, a first conduit connecting said reservoir to said barrel, a second conduit connecting said third port to the first port of one of said cylinders, a third conduit connecting said fourth port to said first conduit, a fourth conduit connecting said fifth port to the first port of the other of said cylinders, a fixed sleeve in said barrel having a plurality of ports extending therethrough in spaced relation therealong with certain of said ports in registry only with said first, second and third conduits, a second sleeve provided with spaced grooves extending inwardly from its outer surface intermediate the ends thereof mounted within said fixed sleeve for reciprocatory movement, and manual means operatively connected to said second sleeve for effecting the reciprocatory movement of the latter.

2. In a hydraulic system, a pair of cylinders arranged in end to end confronting spaced relation, a first port in said cylinders adjacent each of said confronting ends, a second port in said cylinders adjacent each of the nonconfronting ends, a pipe connecting said second ports of said cylinders together, a piston mounted in each of said cylinders for reciprocatory movement, a rod positioned in each of said cylinders and having one end secured to the adjacent piston and having the other end projecting out of and beyond the nonconfronting end of the adjacent cylinder adapted to be connected to a member actuable in response to the reciprocatory movement of the piston in the adjacent cylinder, a flexible hollow boot surrounding the projecting end portion of each of said rods and having one end fixedly secured to the nonconfronting end of each of said cylinders, a reservoir adapted to contain fluid, a control valve including a barrel provided with a third, fourth and fifth port arranged in spaced relation, a first conduit connecting said reservoir to said barrel, a second conduit connecting said third port to the first port of one of said cylinders, a third conduit connecting said fourth port to said first conduit, a fourth conduit connecting said fifth port to the first port of the other of said cylinders, a pump including an inlet and an outlet, a fifth conduit connecting the inlet of said pump to said first conduit, a sixth conduit connecting the outlet of said pump to said first conduit, a fixed sleeve in said barrel having a plurality of ports extending therethrough in spaced relation therealong with certain of said ports in registry only with said first, second and third conduits, a second sleeve provided with spaced grooves extending inwardly from its outer suface intermediate the ends thereof mounted within said fixed sleeve for reciprocatory movement, and manual means operatively connected to said second sleeve for effecting the reciprocatory movement of the latter.

3. In a hydraulic system, a pair of cylinders arranged in end to end confronting spaced relation, a first port in said cylinders adjacent each of said confronting ends, a second port in said cylinders adjacent each of the nonconfronting ends, a pipe connecting said second ports of said cylinders together, a piston mounted in each of said cylinders for reciprocatory movement, a rod positioned in each of said cylinders and having one end secured to the adjacent piston and having the other end projecting out of and beyond the nonconfronting end of the adjacent cylinder adapted to be connected to a member actuable in response to the reciprocatory movement of the piston in the adjacent cylinder, a flexible hollow boot surrounding the projecting end portion of each of said rods and having one end fixedly secured to the nonconfronting end of each of said cylinders, a reservoir adapted to contain fluid, a barrel provided with a third, fourth and fifth port arranged in spaced relation, a first conduit connecting said reservoir to said barrel, a second conduit connecting said third port to the first port of one of said cylinders, a third conduit connecting said fourth port to said first conduit, a fourth conduit connecting said fifth port to the first port of the other of said cylinders, a pump including an inlet and an outlet, a fifth conduit connecting the inlet of said pump to said first conduit, a sixth conduit connecting the outlet of said pump to said first conduit, a fixed sleeve in said barrel having six ports arranged in spaced relation therealong and extending therethrough with two of said ports being in registry only with said first, second and third conduits, a second sleeve provided with spaced grooves extending inwardly from its outer surface intermediate the ends thereof mounted within said fixed sleeve for reciprocatory movement, and manual means operatively connected to said second sleeve for effecting the reciprocatory movement of the latter.

WESLEY H. BROWN.

REFERENCES CITED

The following references are of record in the file of this patent:

UNITED STATES PATENTS

| Number | Name | Date |
|---|---|---|
| Re. 19,515 | Bragg | Apr. 9, 1935 |
| 1,716,121 | Giffen | June 4, 1929 |
| 2,244,471 | Nichols | June 3, 1941 |
| 2,249,343 | Balsiger | July 15, 1941 |
| 2,252,660 | Kulikoff | Aug. 12, 1941 |
| 2,268,968 | Stinne | Jan. 6, 1942 |
| 2,362,262 | French | Nov. 7, 1944 |